(12) United States Patent
Sayyaparaju et al.

(10) Patent No.: US 9,514,168 B2
(45) Date of Patent: Dec. 6, 2016

(54) METHOD AND SYSTEM OF IMPLEMENTING A DATABASE INDEX IN SHARED MEMORY

(71) Applicants: Sunil Sayyaparaju, Ravulapalem (IN); Andrew Gooding, Mountain View, CA (US); Venkatachary Srinivasan, Sunnyvale, CA (US)

(72) Inventors: Sunil Sayyaparaju, Ravulapalem (IN); Andrew Gooding, Mountain View, CA (US); Venkatachary Srinivasan, Sunnyvale, CA (US)

( * ) Notice: Subject to any disclaimer, the term of this patent is extended or adjusted under 35 U.S.C. 154(b) by 869 days.

(21) Appl. No.: 13/897,441

(22) Filed: May 20, 2013

(65) Prior Publication Data
US 2014/0344530 A1   Nov. 20, 2014

(51) Int. Cl.
*G06F 17/30* (2006.01)

(52) U.S. Cl.
CPC ... *G06F 17/30312* (2013.01); *G06F 17/30165* (2013.01)

(58) Field of Classification Search
CPC ............... G06F 17/30312; G06F 17/30165
See application file for complete search history.

(56) References Cited

U.S. PATENT DOCUMENTS

| 2007/0016555 A1* | 1/2007 | Ito | G06F 17/30321 |
| 2010/0023480 A1* | 1/2010 | Ito | G06F 17/30321 |
| | | | 707/E17.002 |

* cited by examiner

*Primary Examiner* — Aracelis Ruiz

(57) ABSTRACT

In one exemplary embodiment, a method includes allocating an arena block of a shared memory of a database node server. The arena block is divided into one or more slots. The one or more slots include a discreet and constant area of memory within the arena block. Each slot is assigned a constant-memory address relative to an arena-block's shared memory address. The index is implemented as a red-black tree data structure. Each red-black tree node is mapped to a slot. Each red-black-tree node is provided a pointer to one or more neighbor nodes. The index stored in shared memory can be used during a 'warm' rebooting process.

20 Claims, 5 Drawing Sheets

METHOD AND SYSTEM OF IMPLEMENTING A DATABASE INDEX IN SHARED MEMORY

CROSS-REFERENCE TO RELATED APPLICATIONS

This application claims the benefit of U.S. Provisional Application No. 61/788,838, filed Mar. 15, 2013 and titled 'METHOD AND SYSTEM OF MANAGING TRANSACTIONS IN A DISTRIBUTED DATABASE ENVIRONMENT'. This provisional application is incorporated herein by reference.

BACKGROUND

1. Field

This application relates generally to data storage, and more specifically to a system, article of manufacture and method for implementing a database index in shared memory.

2. Related Art

A distributed database can include a plurality of database nodes. If a database node goes offline, a 'cold' restart (e.g. the database node's machine is physically turned off and back on again causing, an initial boot of the machine) may be implemented before the database node is again available in the distributed database system. Currently, many production database nodes can have periods of over an hour to complete a 'cold' restart process. The 'cold' restart process can include various operations such as rebuilding, an index and/or other data structures. These operations can involve reading the data from the storage drives. Consequently, these operations may increase the time overhead of the 'cold' restart process.

BRIEF SUMMARY OF THE INVENTION

In one aspect, a method includes allocating an arena block of a shared memory of a database node server. The arena block is divided into one or more slots. The one or more slots include a discreet and constant area of memory within the arena block. Each slot is assigned a constant-memory address relative to an arena-block's shared memory address. The index is implemented as a red-black tree data structure. Each red-black tree node is mapped to a slot. Each red-black-tree node is provided a pointer to one or more neighbor nodes.

Optionally, the arena block can comprise a contiguous-arena block. The contiguous-arena block can include a contiguous region of memory that is allocated for storing the index. The contiguous-arena block can be provided an address by a database node server's operating system. The address can include a relative address. A plurality of arena-blocks can be allocated in the shared memory based on a size of the index. A data storage metadata can be stored in random access memory and separately rebuilt during a rebooting process. The arena-block's identifier can include the arena-block's shared memory address. The pointer to the one or more neighbor nodes can include the one or more neighbor nodes offset slot from an arena-block's identifier.

BRIEF DESCRIPTION OF THE DRAWINGS

The present application can be best understood by reference to the following description taken in conjunction with the accompanying figures, in which like parts may be referred to by like numerals.

Figure 1:
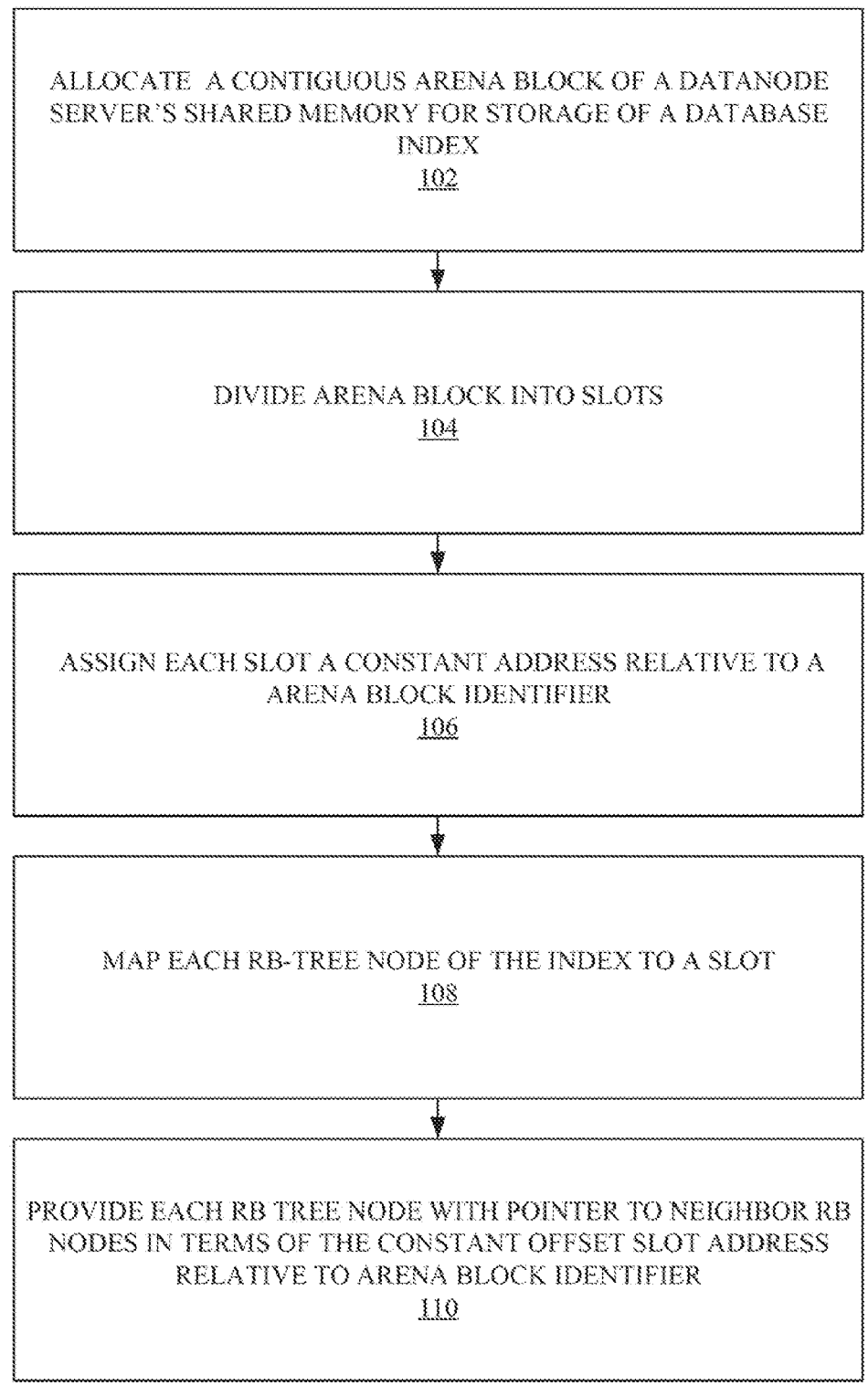
FIG. 1 depicts an example process for implementing a database index in shared memory, according to some embodiments.

The Figures described above are a representative set, and are not an exhaustive with respect to embodying the invention.

DETAILED DESCRIPTION

Disclosed are a system, method, and article of manufacture for implementing a database index in shared memory. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments, in the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method.

Indeed, some arrows or other connectors may be used to indicate only the logical flow of the method. For instance, an arrow may indicate a waiting or monitoring, period of unspecified duration between enumerated steps of the depicted method. Additionally, the order in which a particular method occurs may or may not strictly adhere to the order of the corresponding steps shown.

FIG. 1 depicts an example process 100 for implementing a database index in shared memory, according to some embodiments. An index can be used to determine the location of data in a database implemented in a database node. It is noted that more than one partition can be implemented in a database node. Each partition can have its own index. As used herein, the index discussed below in the singular can be taken as representative of all other indexes for other partitions in the database node. The index can be implemented with a red-black tree data structure. The index can be run from (e.g. stored in) shared memory of a node's server such that when the index's process is lost (e.g. stops), the shared memory can retain the index, where it would otherwise be lost if run from ordinary random access memory (RAM). Thus, in at least one example embodiment, the index can constantly be in the shared memory. Shared memory can be a block of RAM that can be accessed by several different central processing units (CPUs) in a multiple-processor computer system. Process 100 illustrates an example method of accomplishing this. In step 102, of process 100, a contiguous arena-block of the database node server's shared memory is allocated to store the index. The arena-block can be a large, contiguous region of memory that is, allocated for a specific purpose such as storing the index. The arena-block can be provided an address (e.g. a relative address) by the database node server's operating system (e.g. a LINUX® operating system). It is noted that in some embodiments, more than one arena-block can be allocated in the shared memory depending on the size of the index.

In step 104, the arena-block can be divided in to slots. A slot can be a discreet and constant area of memory within the arena-block. In step 106, each slot is assigned a constant address relative to the arena-block's shared memory address. The slot address can be determined using an offset from the arena-block's identifier (e.g. a shared memory address). As the index can be implemented as a red-black tree data structure, in step 108, each red-black tree node can be mapped to a slot and stored accordingly. In one example, an arena block can include several characteristics, inter alia: a simple index, (e.g. if there are twelve (12) blocks with indexes numbered '0', '1', '2', . . . '11'—and the index can be stored along with a slot offset to specify a slot); a unique identifier (ID), recognized by the operating system (e.g. the ID can be used to recover or reattach to an index block and can remain the same across a restart operation); and a memory address (e.g. used by the programming language to access the contents).

In step 110, each red-black-tree node can be provided a pointer to its neighbor nodes. The pointer can be implemented in terms of the neighbor node's constant offset slot address relative to the arena-block's identifier. Various arithmetic operations can be performed to locate the red-black tree neighbor node. In one example, a hash function can be implemented to increase the speed of searching the red-black tree of the index.

It is noted that, in some example embodiments, storage information (e.g. storage statistics, information about the state of storage all over the drive, and the like) can be stored in RAM and can be rebuilt during a rebooting process. Some of this information can be rebuilt by scanning the index in the system's shared memory. However in other example embodiments, some or all of the storage information can also be stored in the system's shared memory, and need not be rebuilt, during reboot. In the event of an uncontrolled shutdown of the process, where there is a risk of inconsistency between the stored data and the index, the index can be removed and rebuilt from the stored data to ensure consistency between the index and the database.

In some embodiments, a list of tree roots (e.g. a base node) and sentinels (e.g. 'book-end' node) for each red-black tree can be stored in shared memory. This list can be utilized when restoring (e.g. finding the red-black tree in the arena) a red-black tree. For example, this list can be stored in an extra block of shared memory. A root can define where all the red-black trees in all the arena blocks start. This metadata block can be examined first in order to restore the red-black tree. In some examples, additional metadata such as a verification flag that indicates, inter alia, that the database node shut down in a proper manner (and/or other indicators that the index and the stored data are in a synchronized state) and a reattachment operation is valid, a correct version of the database node server compared with the version of the shared memory layout, and the like.

Figure 2:
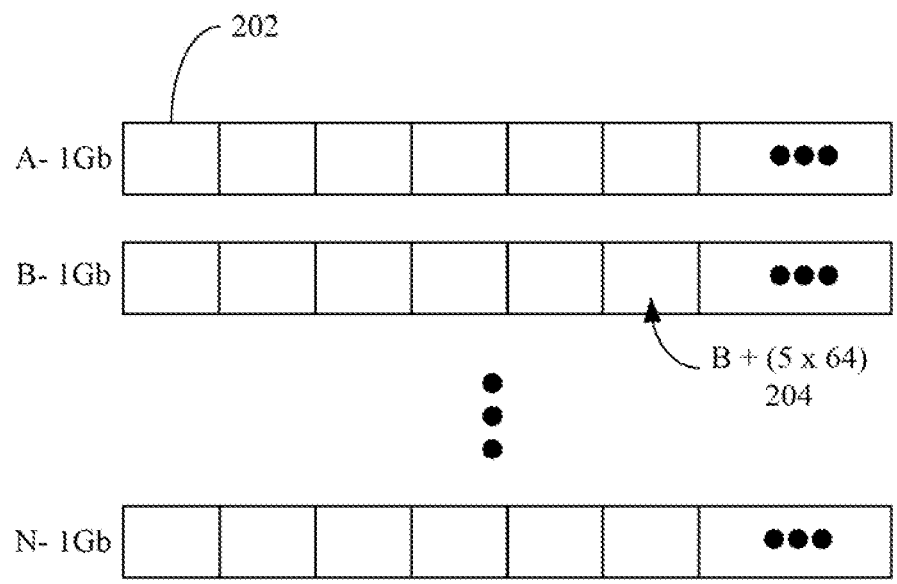
FIG. 2 depicts an example of slot offset addressing in a set of arena-blocks located in a system's shared memory, according to some embodiments.

FIG. 2 depicts an example of slot offset addressing in a set of arena-blocks located in a system's shared memory, according, to some embodiments. In one example, A-N arena-blocks 200 can be created in a system's shared memory. The A-N arena-blocks 200 can be set at one gigabyte each and exhibit the characteristics of an arena block described supra e.g. contiguous, etc.). Each arena block can be divided into slots of 64 bytes each (e.g. slot 202). Each slot can be identified by an offset identifier relative to the shared-memory address of the block times the set constant size of the slots in the specified bloc. For example, slot 204 can have an offset identifier of (100×64). Thus, slot 204 would be offset one-hundred slots from the offset from the shared-memory address of the block 'B' with block 'B' having slot sizes of 64 bytes each. The values provided by this example are for purposes of explanation and not of limitation. Values for other examples can be varied.

Figure 3:
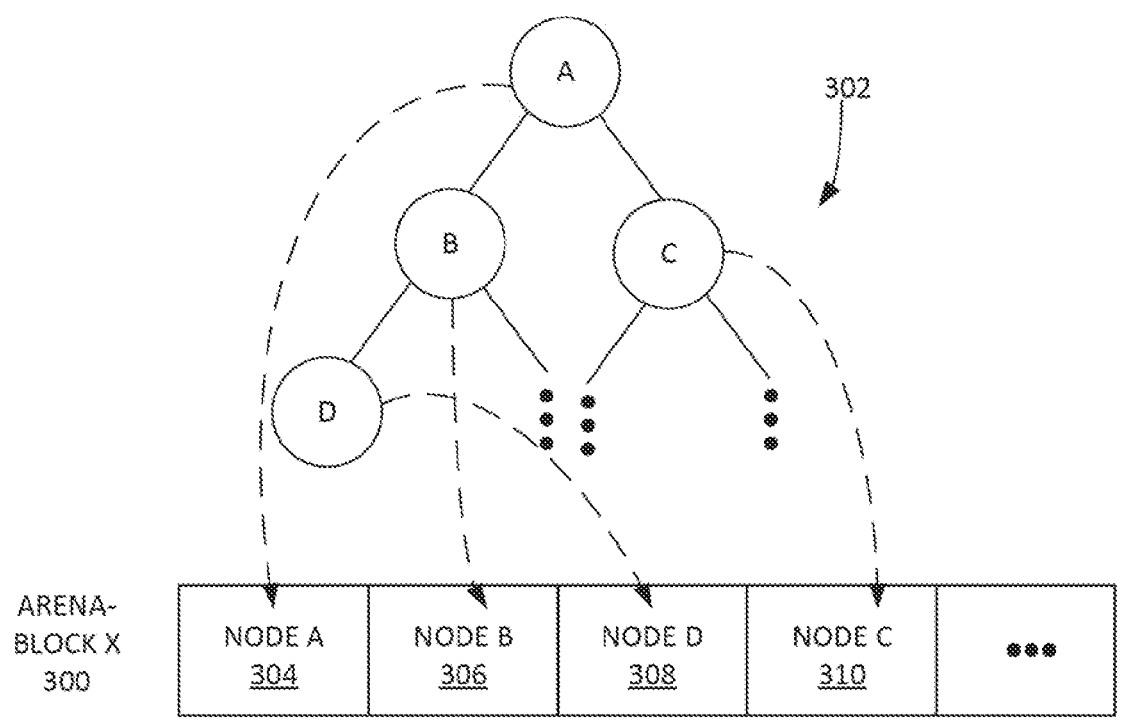
FIG. 3 depicts an example of mapping an red-black tree to an arena-block, according to some embodiments.

FIG. 3 depicts an example of mapping a red-black tree 302 to an arena-block. 'X' 300, according to some embodiments. Red-black tree 302 can include various nodes such as A-D, etc. Arena-block 'X' 300 can be split into equal slots. Each node of red-black tree 302 can be assigned a slot. The data associated with each node can be stored in the memory space associated with the particular slot. For example, node A can be stored in slot for node A 304 and so on. A node's pointers can be rewritten based on offset addressing from the shared-memory address of arena-block 'X' 300 (see FIG. 2 supra). It is noted that while a red-black tree is utilized for exemplary purposes, in other embodiments, any specialized tree-based data structure can be utilized with the processes provided in FIGS. 1-3.

In one example embodiment, the index arena (and in some examples other additional data) is stored in system shared memory, such that it persists after the database node server daemon stops. In one example, on restarting, database node server daemon can then reattach to the persisted memory, rebuild, restore and/or locate various data structures, and resume operation without reading any record data from storage drives. Such a restart can be extremely fast relative to a 'cold' restart process. The database node server daemon can make use of LINUX® system shared memory. A server node's database index, along with various other critical data, can be allocated in system shared memory.

In one example, shared memory can persist even when a server process is stopped. On restarting, the server process can reattach to the persisted memory including the index and other data, restores some specified internal state, and rejoins its distributed database cluster. Accordingly, the server process no longer needs to read all the record data from storage drives to rebuild the index. Anode's default behavior can be set to attempt to this 'warm restart' as a default setting. In some situations, a server node may first attempt to a warm restart mode but determine that it cannot do so, and will switch to a cold start mode (e.g. server process reads record data from storage drives to rebuild the index). If a node does switch to cold start mode, the log file will show this, and should indicate the reason for the switch.

Exemplary Environment and Architecture

Figure 4:
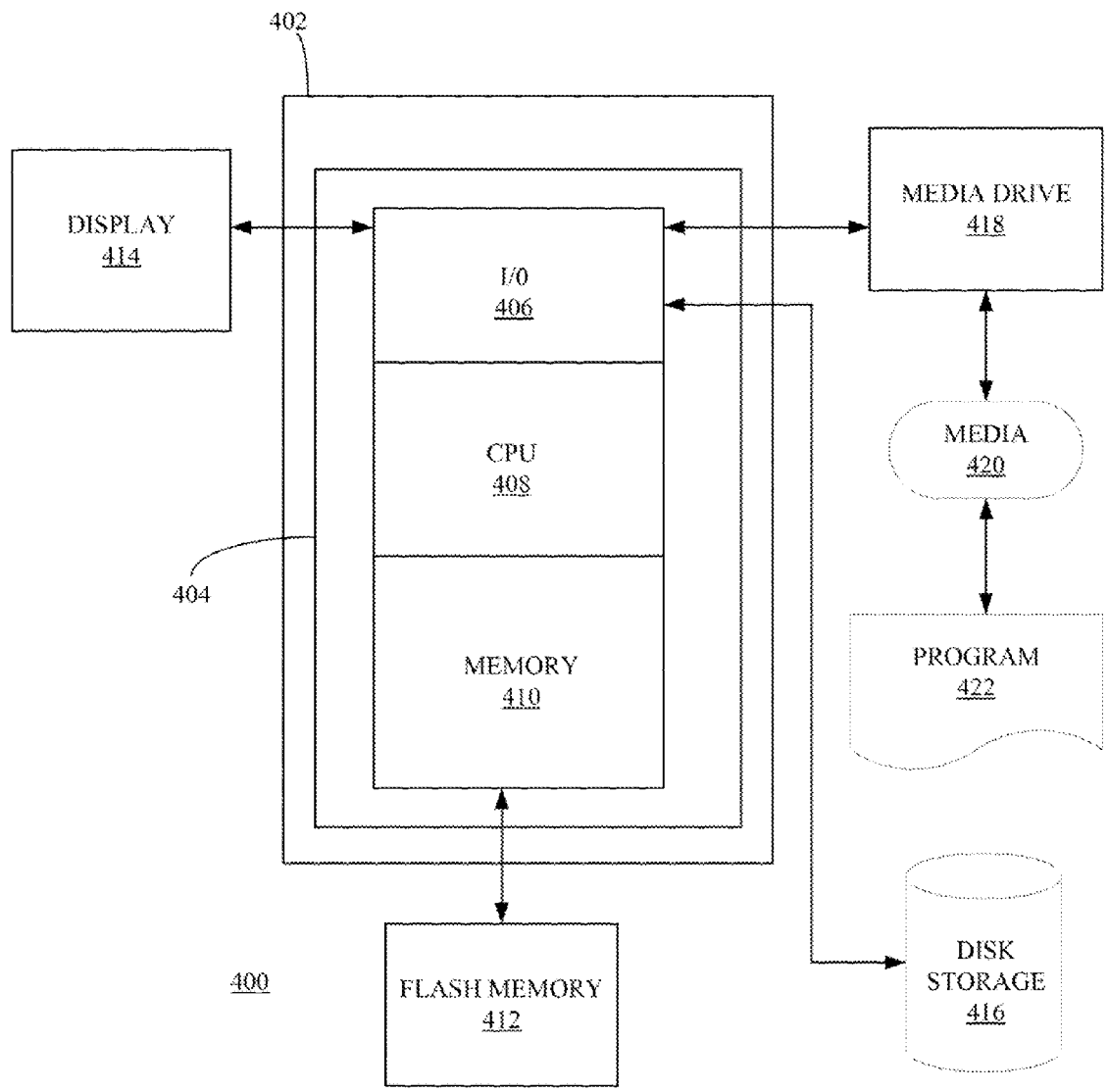
FIG. 4 is a block diagram of a sample computing environment that can be utilized to implement some embodiments.

FIG. 4 depicts an exemplary computing system 400 that can be configured to perform any one of the processes provided herein. In this context, computing, system 400 may include, for example, a processor, storage, and I/O devices (e.g., monitor, keyboard, disk drive, Internet connection, etc.). However, computing, system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a mother-board 404 having, an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can include programs 422 and/or data. Computing system 400 can include a web browser. Moreover, it is noted that computing system 400 can be configured as a NoSQL distributed database server with a solid-state drive (SSD).

Figure 5:
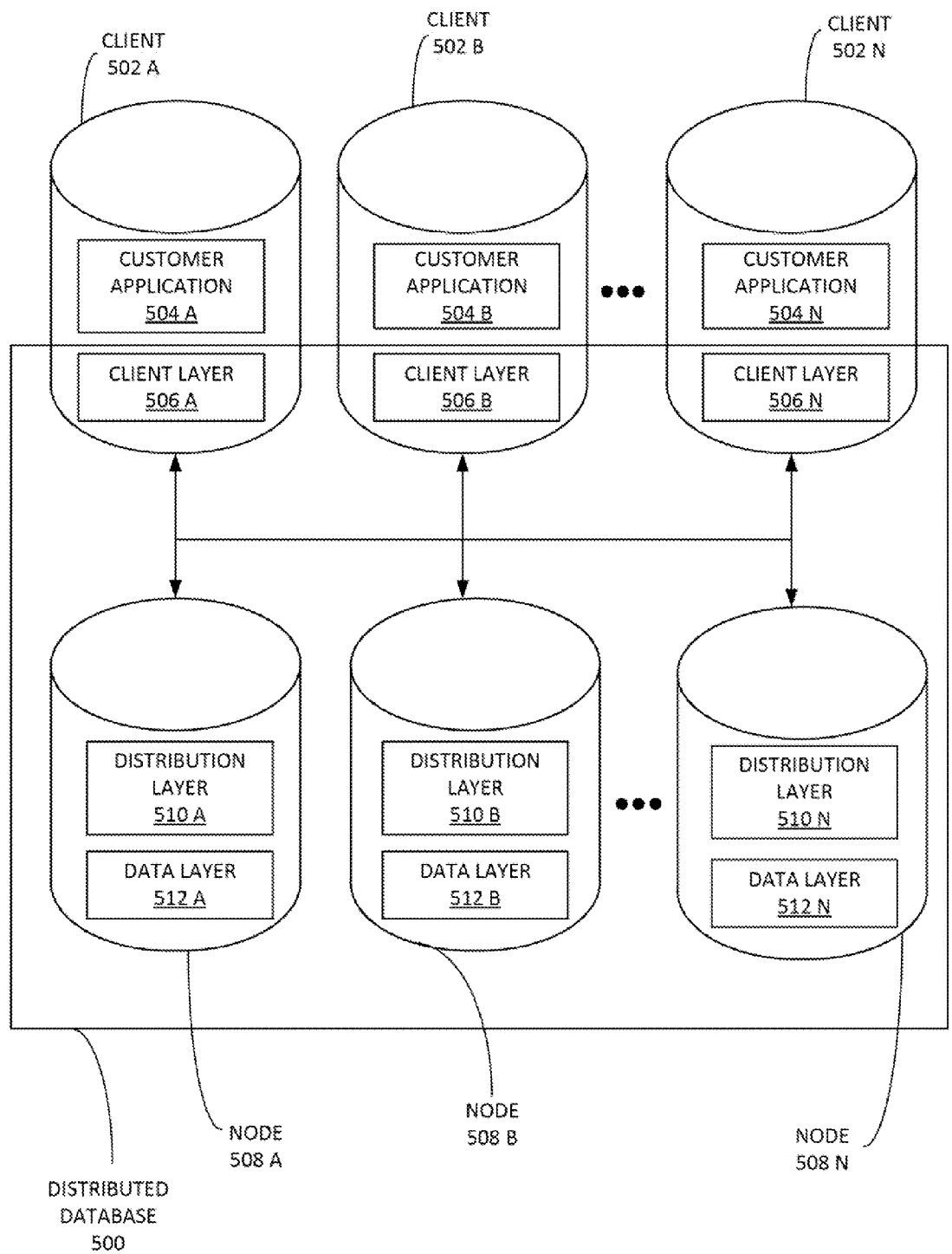
FIG. 5 shows, in a block diagram format, a distributed database system (DDBS) operating in a computer network according to an example embodiment.

FIG. 5 shows, in a block diagram format, a distributed database system (DDBS) 500 operating in a computer network according to an example embodiment. In some examples. DDBS 500 can be an Aerospike® database. DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track cluster configuration and manage the transaction requests, making, any change in cluster membership completely transparent to the customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, Isolation, and Durability.

Atomicity.

A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency.

This property deals with maintaining consistent data in a database system. A transaction can transform the database from one consistent state to another. Consistency falls under the subject of concurrency control.

Isolation.

Each transaction should carry out its work independently of any other transaction that may occur at the same time.

Durability.

This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition. Distribution layer 510 A-N can ensure that the cluster remains fully operational when individual server nodes are removed from or added to the cluster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format reduce memory requirements, the system can be configured to use low level access to the physical storage media to further improve performance and the likes. It is noted, that in some embodiments, no additional cluster management servers and/or proxies need be set up and maintained other than those depicted in FIG. 5.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive

What is claimed as new and desired to be protected by Letters Patent of the United States is:

1. A method comprising
   allocating an arena block of a shared memory of a database node server;
   dividing the arena block into one or more slots, wherein the one or more slots comprise a discreet and constant area of memory within the arena block;
   assigning each slot a constant-memory address relative to an arena-block's shared memory address;
   implementing an index as a red-black tree data structure;
   mapping each red-black tree node to a slot; and
   providing each red-black tree node a pointer to one or more neighbor nodes.

2. The method of claim 1 further comprising:
   reattaching, with a server process, to a persisted memory of the database node during a restart operation, wherein the persisted memory comprises the index.

3. The method of claim 1, wherein the arena block comprises a one gigabyte contiguous-arena block, and wherein the arena block is divided into slots of sixty-four bytes each.

4. The method of claim 2, wherein a contiguous-arena block comprises a contiguous region of memory that is allocated for storing the index.

5. The method of claim 4, wherein the address comprises a relative address.

6. The method of claim 4, wherein a plurality of arena-blocks are allocated in the shared memory based on a size of the index.

7. The method of claim 3, wherein the contiguous-arena block is provided an address by a database node server's operating system.

8. The method of claim 1, wherein a data storage metadata is stored in a random access memory and wherein the data storage metadata is separately rebuilt during a restart operation.

9. The method of claim 8, wherein the arena-block's identifier comprises the arena-block's shared memory address.

10. The method of claim 1, wherein the constant-memory address of the slot is determined using an offset from an arena-block's identifier.

11. The method of claim 10, wherein the pointer to the one or more neighbor nodes comprises the one or more neighbor nodes offset slot from an arena-block's identifier.

12. The method of claim 1, wherein a list comprising a root-node metadata and a sentinel-node metadata for the red-black tree data structure is stored in the shared memory.

13. A computer system comprising:
    a processor configured to execute instructions;
    a memory containing instructions when executed on the processor, causes the processor to perform operations that:
    allocate an arena block of a shared memory of a database node server;
    divide the arena block into one or more slots, wherein the one or more slots comprise a discreet and constant area of memory within the arena block;
    assign each slot a constant address relative to an arena-block's shared memory address;
    implement an index as a red-black tree data structure;
    map each red-black tree node to a slot; and
    provide each red-black-tree node a pointer to one or more neighbor nodes.

14. The computer system of claim 13, wherein the arena block comprises a one gigabyte contiguous-arena block, and wherein the arena block is divided into slots of sixty-four bytes each.

15. The computer system of claim 13, wherein a contiguous-arena block comprises a contiguous region of memory that is allocated for storing the index.

16. The computer system of claim 15, wherein the contiguous-arena block is provided an address by a database node server's operating system.

17. The computer system of claim 13, wherein the address comprises a relative address.

18. The computer system of claim 13, wherein a plurality of arena-blocks are allocated in the shared memory based on a size of the index, and wherein the shared memory comprises a LINUX® system shared memory.

19. The computer system of claim 13, wherein an arena-block's identifier comprises the arena-block's shared memory address.

20. The computer system of claim 13, wherein a list comprising a root-node metadata and a sentinel-node metadata for the red-black tree data structure is stored in the shared memory.

* * * * *